Figure 1:
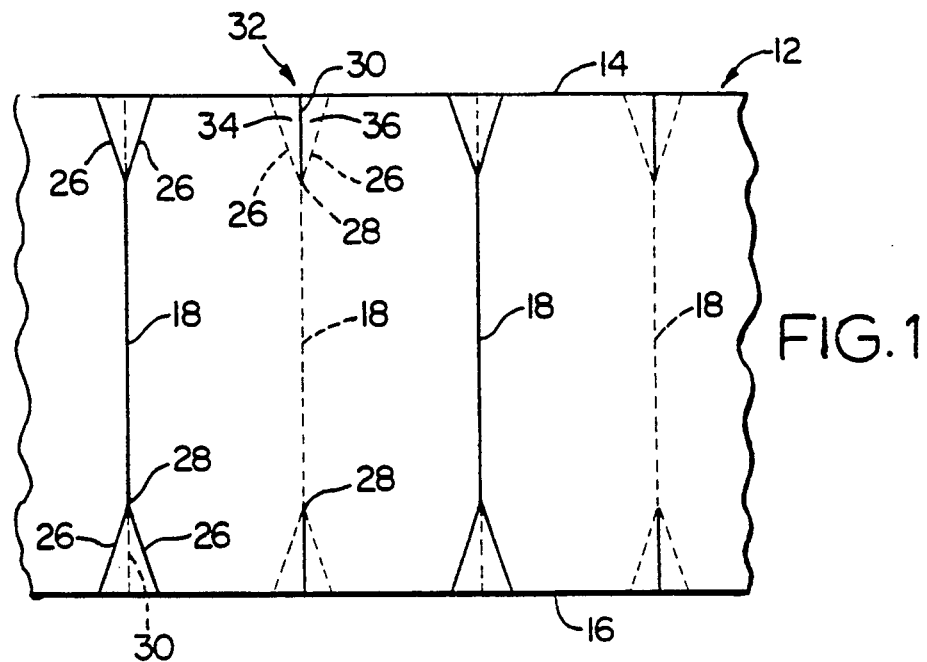

United States Patent [19]

Gabrielson

[11] Patent Number: 5,128,039
[45] Date of Patent: Jul. 7, 1992

[54] FILTER WITH DELTA WEDGE PLEAT

[75] Inventor: Robert Gabrielson, North Smithfield, R.I.

[73] Assignee: Allied-Signal Inc., Morristown, N.J.

[21] Appl. No.: 710,222

[22] Filed: Jun. 4, 1991

[51] Int. Cl.⁵ .............................................. B01D 27/06
[52] U.S. Cl. ................................ 210/450; 210/493.2; 210/493.5; 55/498; 55/500; 55/502; 55/521
[58] Field of Search ................... 210/450, 493.1, 493.2, 210/493.5; 55/497, 498, 500, 502, 521

[56] References Cited

U.S. PATENT DOCUMENTS

| | | |
|---|---|---|
| 2,980,208 | 4/1961 | Neumann . |
| 3,640,396 | 2/1972 | Brownell . |
| 3,686,837 | 8/1972 | Hopkins et al. . |
| 3,859,068 | 1/1975 | McLaren et al. . |
| 3,937,663 | 2/1976 | Bessiere . |
| 4,151,095 | 4/1979 | Wright . |
| 4,452,619 | 6/1984 | Wright et al. . |
| 4,512,891 | 4/1985 | Wright et al. . |
| 4,710,297 | 12/1987 | Suzuki et al. ................. 55/521 |

Primary Examiner—Robert A. Dawson
Assistant Examiner—Wanda L. Millard
Attorney, Agent, or Firm—Ken C. Decker; William N. Antonis

[57] ABSTRACT

A filter cartridge comprising an elongated sheet of porous filter material folded into an array of primary pleats is further folded to define secondary pleats which are tucked between the primary pleats. The secondary pleats define tapered portions at the top and bottom of the filter media, thereby reducing the width of the pleats at the top and bottom thereof to a width less than the primary width of the pleats, to thereby minimize the amount of sealant required to seal the ends of the pleats. The secondary pleats also resist radial and circumferential collapse of the pleats during filtering.

10 Claims, 1 Drawing Sheet

FILTER WITH DELTA WEDGE PLEAT

This invention relates to a filter cartridge of the general type used to filter fluids such as the combustion air, lubricating oil, or fuel of a motor vehicle.

Pleated paper filter cartridges are commonly used to filter the combustion air, lubricating oil, and fuel of a motor vehicle. Such cartridges include an array of pleated filtering material, which commonly is porous filter paper, but also may be other materials, such as a non-woven, air laid cellulose sheet. The filtering material is pleated by scoring a sheet of filter paper or other material with transversely extending fold lines, and then folding the filter paper along the fold lines to collect the pleats. The filter cartridge may either be a cylindrical filter cartridge supported by a centertube normally made of metal, or may also be a panel filter element which is commonly used to filter combustion air. In panel filter elements, the pleats are collected into a flat panel instead of being formed into a cylinder. In either case, the ends of the pleats must be sealed with an adhesive sealing material which is sometimes carried in metal or paper end caps which, in the case of a cylindrical cartridge, circumscribe the ends of the filter to prevent the fluid being filter from bypassing the filtering media.

In order to speed the manufacturing process, it has recently been proposed to use a sealant that is cured by ultraviolet light to seal the ends of the end caps. Such ultraviolety cured sealants are much more expensive than conventional sealants. Accordingly, it is desirable to minimize the quantity of sealant necessary to seal the ends of the filter cartridge. It is also desirable for cost reasons to minimize the length of the centertube required in cylindrical filters. It is also desirable to provide some mechanism to prevent the collapse of the pleats against one another when the filter is used. Ideally, such a mechanism would also not reduce the size of the usable filter area provided by the cartridge.

The present invention solves the aforementioned problems by providing secondary score lines for each of the primary score lines from which the primary pleats are formed. These secondary score lines intersect the primary score lines, and are folded so that a secondary pleat is formed within the primary pleat. Accordingly, the primary pleats include tapered portions adjacent the end thereof, so that the width of the end of the pleat that must be sealed is substantially less than the width of the primary portion of the pleat, so that the amount of sealant required is reduced. The secondary pleat folded within the primary pleat also spaces the primary pleats, thereby resisting collapse of the primary pleats against one another. Since the secondary pleat is an active pleat, the area of the filter cartridge used for filtration is not appreciably altered.

Figure 2:
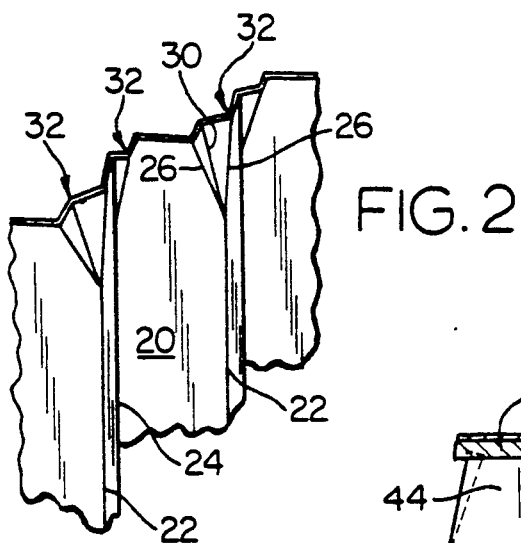
Figure 3:
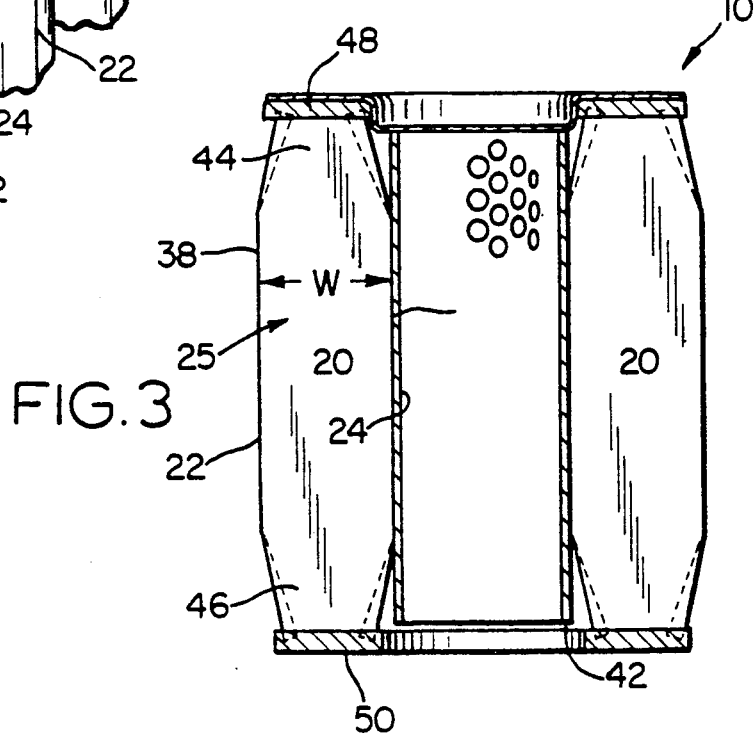

These and other advantages of the present invention will become apparent from the following description, with reference to the accompanying drawings, in which FIG. 1 illustrates a sheet of filter material before the pleats are folded and gathered, but after score lines for folding the sheet have been embossed upon the sheet;

FIG. 2 is a perspective view of the gathered pleats arranged in cylindrical form; and FIG. 3 is a cross-sectional view of a filter cartridge made pursuant to the present invention taken longitudinally through the pleated media arranged in a cylindrical form about a centertube.

Referring now to the drawings, a filter cartridge generally indicated by the numeral 10 (FIG. 3) is made from an elongated sheet of porous filter material generally indicated by the numeral 12 (FIG. 1). The sheet 12 is commonly a sheet of porous filter paper, but may also be any other suitable filtering material, such as a sheet of non-woven, air laid, cellulose fibers impregnated with a suitable binder material. The sheet 12 includes an upper edge 14, a lower edge 16, and is scored with transversely extending (with respect to the upper and lower edges 14, 16) substantially parallel primary fold lines generally indicated by the numeral 18, which extend between the upper and lower edges 14, 16. The sheet is folded along the primary fold lines 18 to form an array of primary pleats 20 which extend between the fold lines, so that alternate ones of the fold lines 18 define opposite tips 22, 24 of the primary pleats 20 so that each of the primary pleats includes a primary portion 25 having a width W equally substantially to the distance between the primary fold lines 18.

The sheet 12 is also folded along a series of secondary fold lines 26. Each of the secondary lines 26 extends from either the top or bottom edge 14 or 16 of the sheet 12 to an intersection 28 with the corresponding primary fold line 18. The portion of the primary fold lines 18 between the intersection 28 and the top or bottom edge 14 or 16 defines a secondary portion 30 of the primary fold line 18. The sheet 12 is folded along the secondary fold lines 26 in the same direction that the portion of the primary fold lines 18 between the intersections 28 are folded, but the secondary portion 30 of the fold lines 18 are folded in a direction opposite to the direction in which the portion of the primary fold lines 18 between the intersections 28 are folded. This can be most clearly seen in FIG. 1, wherein folds in one direction are indicated by solid lines and folds in the other direction are indicated by dashed lines. Accordingly, by folding along the secondary fold lines 26 and the secondary portion 30 of the primary fold lines 18 as described above, a subpleat is formed which is tucked between two adjacent main pleats 20. The subpleat is indicated generally by the numeral 32, and is defined by two trianglarly shaped portions 34, 36 which are defined between one of the secondary fold lines 26, the secondary portion 30 of the primary fold line, and the correspond top or bottom edge 14 or 16. Accordingly, the primary filtering surface of the filtering media is defined by the primary pleats 20, but the trianglarly shaped portions 34, 36 define secondary filtering surfaces on both the upstream side 38 and the downstream side 40 of the filter cartridge 10. Both the primary filtering surfaces and the secondary filtering surfaces diverge from the respective portions of primary fold lines 18.

Referring now to FIG. 3, a conventional, perforated metallic centertube 42 prevents radially inward collapse of the downstream side 40 of the filter media folded from the sheet 12. Since the secondary pleats are tucked between corresponding primary pleats adjacent the upper and lower edges of the latter, the secondary pleats resist collapse of the primary pleats against one another during filtering. It will also be noted that, because of the manner in which the secondary pleats are folded, the primary pleats 20 include tapered portions 44, 46 at top and bottom thereof, wherein the pleats 20 taper from the primary width W to a width substantially less than the primary width. The tops and bottoms of the pleats, viewing FIG. 3, are sealed by a band of sealing material 48, 50 which circumscribes the top and bottom of the pleats respectively. The thickness of the sealing material 48, 50 is exaggerated in the FIG. 3, but it is important to minimize the sealing material used, particularly if the sealing material is of the ultravioletly cured type which has recently been proposed for use in filter products. This material is dispensed in molds (not shown) during the filter manufacturing process and the tips of the pleats 20 are inserted in the mold, which is later stripped away during the manufacturing process. Since the width of the pleats and the tops and bottoms, of the tapered portions 44, 46 are substantially less than the primary width W of the pleats, the amount of sealing material is required is less than would otherwise be required if the width of the pleats 20 remained at the primary width W at their tops and bottoms. Since the primary pleats are supported against both radial and circumferential collapse at the taped portions 44, 46 by the effect of the secondary pleats, the length of the centertube 42 can be made less than the entire length of the pleats 20, as illustrated in FIG. 3.

Although only the filter cartridge 10 has been illustrated, it is well known to those skilled in the art that the cartridge 10 would be enclosed within a housing (not shown) which provides an appropriate inlet connection to communicate the fluid to be filtered to the upstream side 38 of the cartridge 10, and an appropriate outlet connection for receiving fluid communicated from the downstream side 40 of the pleats 20, which is carried through the perforated centertube 42.

I claim:

1. A filter cartridge comprising an elongated sheet of porous filter material having an upper edge, a lower edge, and transversely extending, substantially parallel primary fold lines extending between said upper and lower edges, said sheet being folded along said primary fold lines to form an array of primary pleats extending between said fold lines wherein alternate fold lines define opposite tips of said primary pleats so that each of the primary pleats include a primary portion defining a primary width equal to the distance between said primary fold lines, said sheet being further folded along a pair of secondary fold lines for each of said primary fold lines, each of said secondary fold lines extending between an intersection with one of said edges and an intersection with the corresponding primary fold line to form a secondary pleat, the intersection of a corresponding one of said secondary fold lines with said one edge cooperating with a separate intersection of a secondary fold line of an adjoining pleat with said one edge, each of said intersections of said secondary fold lines with the one edge being between said primary fold line and the primary fold line of the adjoining pleat, said intersections of the corresponding secondary fold lines defining a segment of said one edge between the intersection of said secondary fold lines, the portion of the primary fold line between the corresponding edge and said intersection defining a secondary portion of said primary fold line folded in a direction opposite the direction the primary portion of the corresponding primary fold lines is folded so that said secondary pleat is tucked within a corresponding primary pleat.

2. Filter cartridge as claimed in claim 1, wherein said secondary fold lines define a tapered portion of the primary pleats wherein the primary pleats taper from the primary width to a width less than the primary width at said one edge.

3. Filter cartridge as claimed in claim 1, wherein a band of sealing material is applied to said one edge to seal the corresponding ends of the primary pleats.

4. Filter cartridge as claimed in claim 1, wherein the secondary fold lines are folded in the same direction as the primary portion of the primary fold lines.

5. A filter cartridge comprising an elongated sheet of porous filter material having an upper edge, a lower edge, and transversely extending, substantially parallel primary fold lines extending between said upper and lower edges, said sheet being folded along said primary fold lines to form an array of primary pleats extending between said fold lines wherein alternate fold lines define opposite tips of said primary pleats so that each of the primary pleats include a primary portion defining a primary width equal to the distance between said primary fold lines, said sheet being further folded along a pair of secondary fold lines for each of said primary fold lines, each of said secondary fold lines extending between one of said edges and an intersection with the corresponding primary fold line to form a secondary pleat, the portion of the primary fold line between the corresponding edge and said intersection defining a secondary portion of said primary fold line folded in a direction opposite the direction the primary portion of the corresponding primary fold lines is folded so that said secondary pleat is tucked within a corresponding primary pleat, each of said primary pleats including a pair of primary filtering surfaces diverging from the primary portion of a corresponding primary fold line and each of said secondary pleats includes a pair of secondary filtering surfaces diverging from the secondary portion of said corresponding primary fold line and disposed between said pair of primary filtering surfaces of the same primary pleat from which the secondary pleat is formed.

6. Filter cartridge as claimed in claim 5 wherein each of said pair of secondary filtering surfaces is triangular and is defined by said secondary portion of the primary fold line, a corresponding one of said secondary fold lines, and said corresponding edge.

7. Filter cartridge as claimed in claim 6, wherein said secondary fold lines define a tapered portion of the primary pleats wherein the primary pleats taper from the primary width to a width less than the primary width at said one edge.

8. Filter cartridge as claimed in claim 6, wherein a band of sealing material is applied to said one edge to seal the corresponding ends of the primary pleats.

9. A filter cartridge comprising an elongated sheet of porous filter material having an upper edge, a lower edge, and transversely extending, substantially parallel primary fold lines extending between said upper and lower edges, said sheet being folded along said primary fold lines to form an array of primary pleats extending between said fold lines wherein opposite fold lines define opposite tips of said primary pleats so that each of the primary pleats include a primary portion defining a primary width equal to the distance between said primary fold lines, said sheet being further folded along a pair of secondary fold lines for each of said primary fold lines, each of said secondary fold lines extending between an intersection with one of said edges and an intersection with the corresponding primary fold line to form a secondary pleat, the intersection of a corresponding one of said secondary fold lines with said one edge cooperating with a separate intersection of a secondary fold line of an adjoining pleat with said one edge, each of said intersections of said secondary fold lines with the one edge being between said primary fold line and the primary fold line of the adjoining pleat, said intersections of the corresponding secondary fold lines defining a segment of said one edge between the intersection of said secondary fold lines, said secondary pleat being tucked within the primary pleat extending from the corresponding primary fold line, said secondary fold lines and said segment defining a tapered portion of the primary pleats wherein the primary pleats taper from the primary width to a width less than the primary width at said one edge.

10. Filter cartridge as claimed in claim 9, wherein a band of sealing material is applied to said one edge to seal the corresponding ends of the primary pleats.

* * * * *